United States Patent
Nomoto et al.

(10) Patent No.: US 9,490,474 B2
(45) Date of Patent: Nov. 8, 2016

(54) METHOD FOR MANUFACTURING POSITIVE ELECTRODE ACTIVE MATERIAL FOR ENERGY STORAGE DEVICE AND ENERGY STORAGE DEVICE

(75) Inventors: Kuniharu Nomoto, Kanagawa (JP); Takuya Miwa, Kanagawa (JP); Masaki Yamakaji, Kanagawa (JP); Takahiro Kawakami, Kanagawa (JP)

(73) Assignee: Semiconductor Energy Laboratory Co., LTD., Kanagawa, ken (JP)

( * ) Notice: Subject to any disclaimer, the term of this patent is extended or adjusted under 35 U.S.C. 154(b) by 1101 days.

(21) Appl. No.: 13/248,700

(22) Filed: Sep. 29, 2011

(65) Prior Publication Data
US 2012/0088156 A1   Apr. 12, 2012

(30) Foreign Application Priority Data
Oct. 8, 2010 (JP) .................................. 2010-228602

(51) Int. Cl.
*H01M 4/04* (2006.01)
*H01M 4/1397* (2010.01)
(Continued)

(52) U.S. Cl.
CPC .......... *H01M 4/0433* (2013.01); *H01M 4/0471* (2013.01); *H01M 4/1397* (2013.01);
(Continued)

(58) Field of Classification Search
CPC .......... H01M 4/36; H01M 4/58; H01M 4/583
USPC .......... 429/221, 209, 223, 224; 252/502, 506
See application file for complete search history.

(56) References Cited

U.S. PATENT DOCUMENTS 6,645,452 B1 * 11/2003 Barker et al. ............... 423/306
7,179,561 B2   2/2007 Niu et al.
(Continued)

FOREIGN PATENT DOCUMENTS

CN   101562248 A   10/2009
CN   101752561 A   6/2010
(Continued)

OTHER PUBLICATIONS

*Graphene: Functions and Applications*, CMC Publishing Co., Ltd., Jul. 2009, pp. 171-172 with English Translation.
(Continued)

*Primary Examiner* — Stewart Fraser
*Assistant Examiner* — Olatunji Godo
(74) *Attorney, Agent, or Firm* — Nixon Peabody LLP; Jeffrey L. Costellia

(57) ABSTRACT

An energy storage device having high capacity per weight or volume and a positive electrode active material for the energy storage device are manufactured. A surface of a main material included in the positive electrode active material for the energy storage device is coated with two-dimensional carbon. The main material included in the positive electrode active material is coated with a highly conductive material which has a structure expanding two-dimensionally and whose thickness is ignorable, whereby the amount of carbon coating can be reduced and an energy storage device having capacity close to theoretical capacity can be obtained even when a conduction auxiliary agent is not used or the amount of the conduction auxiliary agent is extremely small. Accordingly, the amount of carbon coating in a positive electrode and the volume of the conduction auxiliary agent can be reduced; consequently, the volume of the positive electrode can be reduced.

14 Claims, 6 Drawing Sheets

(51) Int. Cl.
*H01M 4/36* (2006.01)
*H01M 4/58* (2010.01)
*H01M 4/62* (2006.01)
*H01M 4/136* (2010.01)

(52) U.S. Cl.
CPC ........... *H01M4/366* (2013.01); *H01M 4/5825* (2013.01); *H01M 4/625* (2013.01); *H01M 4/136* (2013.01); *Y02E 60/122* (2013.01); *Y02P 70/54* (2015.11)

(56) References Cited

U.S. PATENT DOCUMENTS

| | | | |
|---|---|---|---|
| 7,745,047 | B2 | 6/2010 | Zhamu et al. |
| 7,842,432 | B2 | 11/2010 | Niu et al. |
| 7,939,218 | B2 | 5/2011 | Niu |
| 7,977,007 | B2 | 7/2011 | Niu et al. |
| 7,977,013 | B2 | 7/2011 | Niu et al. |
| 8,278,011 | B2 | 10/2012 | Zhu et al. |
| 8,426,061 | B2 | 4/2013 | Nesper et al. |
| 8,435,677 | B2 | 5/2013 | Kay |
| 9,045,346 | B2 | 6/2015 | Nesper et al. |
| 2008/0254296 | A1 | 10/2008 | Handa et al. |
| 2009/0117467 | A1 | 5/2009 | Zhamu et al. |
| 2010/0021819 | A1 | 1/2010 | Zhamu et al. |
| 2010/0143798 | A1 | 6/2010 | Zhamu et al. |
| 2010/0176337 | A1* | 7/2010 | Zhamu ................ H01M 4/1391 252/182.1 |
| 2010/0233538 | A1 | 9/2010 | Nesper et al. |
| 2010/0248034 | A1 | 9/2010 | Oki et al. |
| 2010/0291438 | A1 | 11/2010 | Ahn et al. |
| 2010/0308277 | A1 | 12/2010 | Grupp |
| 2010/0330421 | A1 | 12/2010 | Cui et al. |
| 2011/0012067 | A1 | 1/2011 | Kay |
| 2011/0111299 | A1 | 5/2011 | Liu et al. |
| 2011/0111303 | A1 | 5/2011 | Kung et al. |
| 2011/0121240 | A1 | 5/2011 | Amine et al. |
| 2011/0133131 | A1 | 6/2011 | Zhou et al. |
| 2011/0159372 | A1 | 6/2011 | Zhamu et al. |
| 2011/0229795 | A1 | 9/2011 | Niu et al. |
| 2011/0269022 | A1* | 11/2011 | Kawakami et al. .......... 429/221 |
| 2011/0269023 | A1* | 11/2011 | Kawakami et al. .......... 429/221 |
| 2012/0058397 | A1* | 3/2012 | Zhamu et al. ............. 429/231.8 |
| 2012/0315550 | A1 | 12/2012 | Liu et al. |

FOREIGN PATENT DOCUMENTS

| | | |
|---|---|---|
| CN | 101849302 | 9/2010 |
| CN | 102113152 | 6/2011 |
| EP | 2228854 A | 9/2010 |
| EP | 2228855 A | 9/2010 |
| EP | 2 237 346 A1 | 10/2010 |
| EP | 2256087 A | 12/2010 |
| EP | 2 309 573 A1 | 4/2011 |
| EP | 2511973 A | 10/2012 |
| JP | 2006-265751 | 10/2006 |
| JP | 2008-257894 | 10/2008 |
| JP | 2009-524567 | 7/2009 |
| JP | 2009-176721 | 8/2009 |
| JP | 2010-040357 | 2/2010 |
| JP | 2010-129332 | 6/2010 |
| JP | 2010-219047 | 9/2010 |
| JP | 2010-219048 A | 9/2010 |
| JP | 2010-275186 A | 12/2010 |
| JP | 2011-503804 | 1/2011 |
| JP | 2011-076931 A | 4/2011 |
| JP | 2011-517053 | 5/2011 |
| KR | 2010-0088667 | 8/2010 |
| KR | 2010-0103426 | 9/2010 |
| KR | 2011-0043646 | 4/2011 |
| WO | WO-2006/062947 A2 | 6/2006 |
| WO | WO-2007/061945 A2 | 5/2007 |
| WO | WO-2009/061685 A1 | 5/2009 |
| WO | WO-2009/127901 A1 | 10/2009 |
| WO | WO-2009/144600 A2 | 12/2009 |
| WO | WO-2010/015969 | 2/2010 |
| WO | WO-2010/016545 A1 | 2/2010 |
| WO | WO-2011/141486 | 11/2011 |

OTHER PUBLICATIONS

Ramana et al., "Synthesis and structural properties of $LiCoPO_4$ cathode material," 212th ECS Meeting Abstract, The Electrochemical Society, vol. 702, p. 307, 2007.

International Search Report (Application No. PCT/JP2011/073037), Dated Jan. 24, 2012.

Written Opinion (Application No. PCT/JP2011/073037), Dated Jan. 24, 2012.

Zhou.X et al., "Graphene modified $LiFePO_4$ cathode materials for high power lithium ion batteries ,", J. Mater. Chem. (Journal of Materials Chemistry), 2011, vol. 21, pp. 3353-3358.

Su.F et al., "Flexible and planar graphene conductive additives for lithium-ion batteries,", J. Mater. Chem. (Journal of Materials Chemistry), 2010, vol. 20, pp. 9644-9650.

Yu.G et al., "Solution-Processed Graphene/$MnO_2$ Nanostructured Textiles for High-Performance Electrochemical Capacitors,", Nano Letters, 2011, vol. 11, No. 7, pp. 2905-2911.

Chinese Office Action (Application No. 201180047894.4), dated Dec. 1, 2014.

* cited by examiner

METHOD FOR MANUFACTURING POSITIVE ELECTRODE ACTIVE MATERIAL FOR ENERGY STORAGE DEVICE AND ENERGY STORAGE DEVICE

TECHNICAL FIELD

The present invention relates to a method for manufacturing a positive electrode active material for an energy storage device and to an energy storage device.

BACKGROUND ART

With an increase in concern for the environmental issues, energy storage devices such as secondary batteries and electric double layer capacitors used for power supply for hybrid vehicles have been actively developed. As the energy storage devices, a lithium-ion battery and a lithium-ion capacitor having high energy performance have attracted attention. The lithium-ion battery, which is compact but can store a large amount of electricity, has been already mounted on a portable information terminal such as a mobile phone or a laptop personal computer, and has helped miniaturization of products.

The secondary battery and the electric double layer capacitor have a structure in which an electrolyte is provided between a positive electrode and a negative electrode. It is known that each of the positive electrode and negative electrode includes a current collector and an active material provided over the current collector. For example, in a lithium-ion battery, a material capable of injection and extraction of lithium ions is used in each electrode as an active material, and an electrolyte is provided between the electrodes.

A lithium oxide and the like are known as a positive electrode active material of a lithium-ion battery (see Patent Document 1).

In the case where the conductivity of a positive electrode active material is insufficient, the conductivity can be increased by coating the positive electrode active material with carbon having a thickness of approximately 5 nm to 30 nm. However, when the positive electrode active material is coated with carbon which does not contribute to charge and discharge, the capacity per volume and weight of a manufactured energy storage device is decreased. The capacity is also decreased in the case where a conduction auxiliary agent is provided, which fills a space in the positive electrode active material and ensures electrical conduction.

REFERENCE

[Patent Document]
[Patent Document 1] Japanese Published Patent Application No. 2008-257894

DISCLOSURE OF INVENTION

An electric vehicle has lower environmental load and lower fuel cost in driving than a conventional vehicle using fossil fuel such as gasoline. However, the weight of a battery used in the electric vehicle is approximately 300 kg to 600 kg and is much heavier than the weight of fuel for the conventional vehicle, which is approximately 20 kg to 60 kg. Moreover, in spite of such a large difference in weight, the running distance of the electric vehicle is approximately one fifth to one third of that of the conventional vehicle in one refueling equivalent.

In view of the above problems, it is an emergent object to reduce the weight of a battery used in an electric vehicle or to increase the capacity of the battery.

Therefore, an object is to manufacture an energy storage device having high capacity per weight or volume and to manufacture a positive electrode active material for the energy storage device.

A surface of a main material included in the positive electrode active material for the energy storage device is coated with two-dimensional carbon.

Two-dimensional carbon, which is one of materials having a structure expanding two-dimensionally, is formed by stacking 1 to 10 sheets of graphene and has a property different from that of a normal metal foil or the like.

Graphene refers to a sheet of one atomic layer of carbon molecules having $sp^2$ bonds.

A feature of graphene is high conductivity. The conductivity of graphene is $10^6$ S/cm or higher and is higher than that of silver. In addition, graphene doped with alkali metal or alkaline earth metal is known to have high conductivity.

For example, when two-dimensional carbon is used for an energy storage device in which charge and discharge are performed by transfer of alkali metal ions or alkaline earth metal ions, such as a lithium-ion secondary battery, the two-dimensional carbon may be doped with alkali metal or alkaline earth metal without particularly performing doping treatment, whereby the conductivity is improved in some cases.

As described later, the main material included in the positive electrode active material is coated with a highly conductive material which has a structure expanding two-dimensionally and whose thickness is ignorable, whereby the amount of carbon coating can be reduced and an energy storage device having capacity close to theoretical capacity can be obtained even when a conduction auxiliary agent is not used or the amount of the conduction auxiliary agent is extremely small. Accordingly, the amount of carbon coating in a positive electrode and the volume of the conduction auxiliary agent can be reduced, so that the volume of the positive electrode can be reduced.

The conductivity of two-dimensional carbon is improved by stacking more sheets of graphene. However, a stack of 11 or more sheets of graphene is unfavorable because it has too strong graphitic characteristics. Further, the stack of 11 or more sheets of graphene has an unignorable thickness. Note that the thickness of one sheet of graphene is 0.34 nm. That is, the total thickness of the two-dimensional carbon is greater than or equal to 0.34 nm and less than or equal to 3.4 nm.

Here, as the main material included in the positive electrode active material, lithium iron phosphate ($LiFePO_4$), lithium nickel phosphate ($LiNiPO_4$), lithium cobalt phosphate ($LiCoPO_4$), or lithium manganese phosphate ($LiMnPO_4$) can be used.

Alternatively, as the main material included in the positive electrode active material, $Li_2FeSiO_4$ or $Li_2MnSiO_4$ may be used.

The main material included in the positive electrode active material preferably has a small particle diameter. When the particle diameter of the main material included in the positive electrode active material is small, the surface area of the positive electrode active material can be increased and charge and discharge characteristics are improved.

On the other hand, when the particle diameter of the main material included in the positive electrode active material is reduced, the thickness of carbon with which the main material included in the positive electrode active material is coated becomes unignorable. For example, when the particle diameter of the main material included in the positive electrode active material is 50 nm and the main material of the positive electrode active material is coated with carbon having a thickness of 5 nm, the total particle diameter is 60 nm, which is 1.2 times as large as the particle diameter of the main material included in the positive electrode active material.

Here, the case where the main material of the positive electrode active material is coated with extremely thin two-dimensional carbon having high conductivity is considered. For example, in the case of one sheet of graphene, the thickness is 0.34 nm; thus the particle diameter of the main material included in the positive electrode active material is increased by only 0.68 nm. It can be seen that the volume and weight of the positive electrode are not increased so much.

As described above, the main material included in the positive electrode active material is preferably coated with two-dimensional carbon for reduction in the particle diameter.

The surface of the main material included in the positive electrode active material for the energy storage device is coated with two-dimensional carbon, whereby the amount of carbon coating in the volume of the positive electrode can be reduced and the volume of the conduction auxiliary agent can be reduced. Consequently, the volume and weight of the positive electrode can be reduced.

Further, in order to improve charge and discharge characteristics of the energy storage device, the particle diameter of the main material included in the positive electrode active material is reduced and the surface of the main material included in the positive electrode active material for the energy storage device is coated with two-dimensional carbon, whereby the volume and weight of the positive electrode can be reduced more significantly.

Accordingly, the energy storage device manufactured using the above positive electrode active material can have favorable charge and discharge characteristics and high capacity per volume and weight.

BEST MODE FOR CARRYING OUT THE INVENTION

Figure 1:
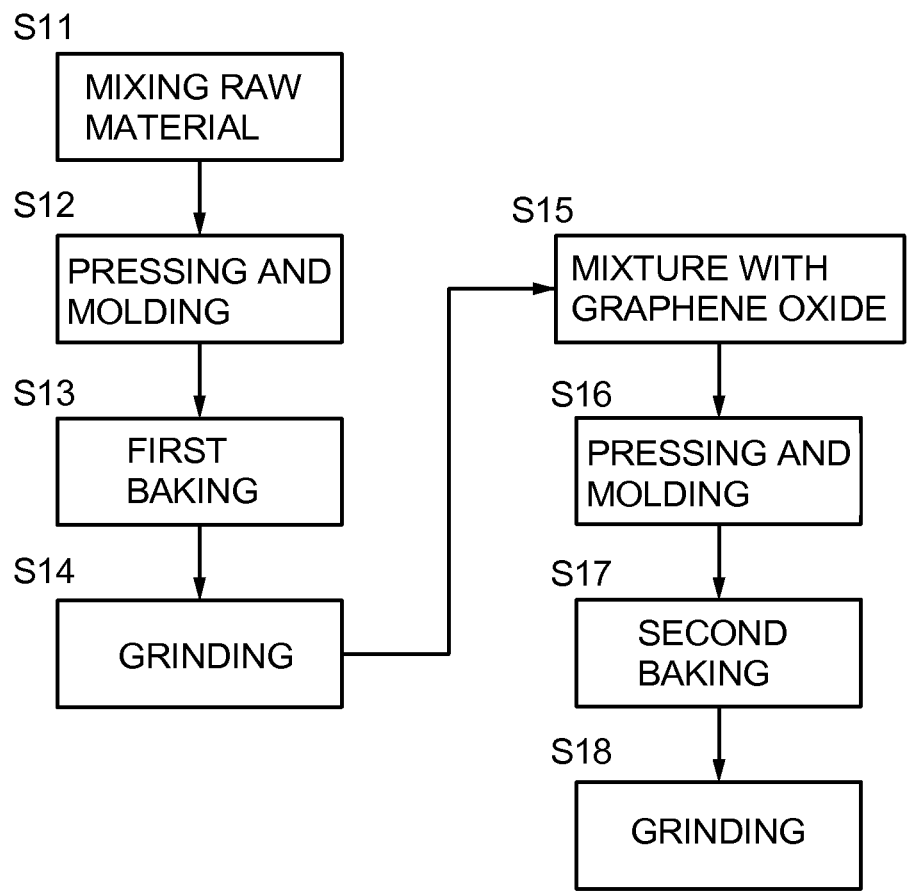
FIG. 1 is a flow chart showing manufacture of a positive electrode active material.

Hereinafter, embodiments of the present invention will be described in detail with reference to the accompanying drawings. However, the present invention is not limited to the description below, and it is easily understood by those skilled in the art that modes and details thereof can be modified in various ways. Therefore, the present invention is not construed as being limited to description of the embodiments. In describing structures of the invention with reference to the drawings, the same reference numerals are used in common for the same portions in different drawings. Note that the same hatch pattern is applied to similar parts, and the similar parts are not especially denoted by reference numerals in some cases.

Note that the ordinal numbers such as "first" and "second" in this specification are used for convenience and do not denote the order of steps or the stacking order of layers. In addition, the ordinal numbers in this specification do not denote particular names which specify the invention.

[Embodiment 1]

In this embodiment, a method for manufacturing a positive electrode active material for a lithium-ion secondary battery which is one embodiment of the present invention will be described with reference to FIG. 1.

As a main material included in the positive electrode active material, $LiFePO_4$, $LiNiPO_4$, $LiCoPO_4$, $LiMnPO_4$, $Li_2FeSiO_4$, or $Li_2MnSiO_4$ can be used.

For example, in the case of using $LiFePO_4$ as the main material included in the positive electrode active material, $Li_2CO_3$, $FeC_2O_4.2H_2O$, and $NH_4H_2PO_4$ which are raw materials are mixed with an organic solvent (such as acetone), are finely ground with a ball mill, and are mixed uniformly (Step S11). After that, the mixture of the raw materials is pressed and molded into pellets (Step S12), and first baking is performed (Step S13). The first baking may be performed at a temperature of 250° C. to 450° C. for 1 hour to 48 hours in an inert atmosphere (such as a nitrogen atmosphere or a rare gas atmosphere), in a reducing atmosphere (such as a hydrogen atmosphere), or under reduced pressure, for example. By the first baking, the mixture of the raw materials is reacted and a reaction product formed of grains which are uniform in size to some degree is generated. Note that in this specification, reduced pressure means a pressure of 10 Pa or lower.

Next, the pellets of the mixture of the raw materials are ground (Step S14), and graphene oxide and the ground mixture of the raw materials are mixed in acetone with a ball mill (Step S15). At this time, the smaller the size of the mixture of the raw materials is, the smaller the particle diameter of a positive electrode active material obtained later is. Here, the preparation is performed so that the particle diameter of the positive electrode active material is 50 nm or less. After that, the mixture including graphene oxide is pressed and molded into pellets (Step S16), and second baking is performed (Step S17). The second baking is performed in an inert atmosphere which does not include an oxidation gas such as oxygen, for example. The second baking is preferably performed in a reducing atmosphere or under reduced pressure. At this time, the temperature may be 500° C. to 800° C. and the treatment time may be 1 hour to 48 hours. By the second baking, reaction of the mixture of the raw materials is completed, so that particulate $LiFePO_4$ with little crystal distortion is obtained and graphene oxide is reduced. Consequently, the $LiFePO_4$ particles can be coated with two-dimensional carbon formed of graphene. Note that when the rate of graphene oxide mixed is increased, a stack of graphene sheets becomes thicker. The rate of graphene oxide mixed may be determined so that the number of graphene sheets is 1 to 10. Here, if the second baking is performed without performing the first baking, the particle diameter of the $LiFePO_4$ particle becomes too large in some cases.

Next, the pellets subjected to the second baking are ground (Step S18), and a positive electrode active material is obtained.

Graphene oxide can be formed by separation of a layer from graphite oxide. For example, graphite oxide may be formed by a known method called a modified Hummers method. Needless to say, a method for forming graphite oxide is not limited to this, and a known method such as a Brodie method or a Staudenmaier method can be used, for example. The modified Hummers method is a method by which graphite is oxidized using concentrated sulfuric acid and potassium permanganate. Here, the Brodie method is a method by which graphite is oxidized using nitric acid and potassium chlorate. The Staudenmaier method is a method by which graphite is oxidized using nitric acid, sulfuric acid, and potassium chlorate. An example of a method for forming graphite oxide by the modified Hummers method and an example of a method for forming graphene oxide will be described below. Note that for the modified Hummers method, *Graphene: Functions and Applications* (P. 171-172) published in July, 2009 by CMC Publishing Co., Ltd. is referred to.

First, single crystal graphite powder is put in concentrated sulfuric acid, and stirred while being cooled with ice. Next, potassium permanganate is slowly added and stirring is performed so that reaction is caused at 35° C. for 30 minutes. Then, a small amount of pure water is slowly added so that reaction further proceeds at 98° C. for 15 minutes. After that, in order to stop the reaction, pure water and hydrogen peroxide mixture are added and filtration is performed, so that graphite oxide is obtained as a reaction product. The graphite oxide is cleaned with 5% dilute hydrochloric acid and pure water, dried, and then dissolved in pure water at a concentration of 0.2 mg/ml. An ultra sonic wave is applied to the obtained solution for 60 minutes, and the solution is subjected to centrifugation at 3000 rpm for 30 minutes. Supernatant fluid obtained here is a graphene oxide dispersed aqueous solution. Note that graphene oxide can be obtained by applying an ultrasonic wave to graphite oxide and separating layers. Graphite oxide has a larger gap between layers than graphite and thus is separated more easily.

In this embodiment, reduction of graphene oxide and synthesis of the main material included in the positive electrode active material are performed at the same time, thereby leading to an advantage in that the process is shortened. Note that graphene can be used instead of graphene oxide.

A conduction auxiliary agent may be mixed into the obtained positive electrode active material, and the mixture may be used as a positive electrode active material. The conduction auxiliary agent accounts for 1 wt % or less of the whole positive electrode active material. As the rate of the conduction auxiliary agent is lower, the volume and weight of an obtained positive electrode active material can be reduced. Therefore, it is preferable not to include the conduction auxiliary agent.

As the conduction auxiliary agent, a material which is itself an electron conductor and does not cause chemical reaction with other materials in a battery device may be used. As the conduction auxiliary agent, for example, a carbon-based material such as graphite, carbon fiber, carbon black, acetylene black, or VGCF (registered trademark); a metal material such as copper, nickel, aluminum, or silver; or powder, fiber, or the like of a mixture thereof may be used. The conduction auxiliary agent is a material that promotes the transfer of carriers between particles of an active material. The conduction auxiliary agent fills a space between the particles of the active material and ensures electrical conduction.

In the case where $LiNiPO_4$ is formed as the main material included in the positive electrode active material, $Li_2CO_3$, NiO, and $NH_4H_2PO_4$ are used as raw materials. In the case where $LiCoPO_4$ is formed, $Li_2CO_3$, CoO, and $(NH_4)_2HPO_4$ are used as raw materials. In the case where $LiMnPO_4$ is formed, $Li_2CO_3$, $MnCO_3$, and $NH_4H_2PO_4$ are used as raw materials. In the case where $Li_2FeSiO_4$ is formed, $Li_2SiO_3$ and $FeC_2O_4 \cdot 2H_2O$ are used as raw materials. In the case where $Li_2MnSiO_4$ is formed, $Li_2SiO_3$ and $MnC_2O_4$ are used as raw materials. Note that the raw materials given here are examples, and a raw material for the main material included in the positive electrode active material is not limited to the above raw materials.

Through the above steps, a highly conductive positive electrode active material coated with two-dimensional carbon can be obtained.

Figure 2A:
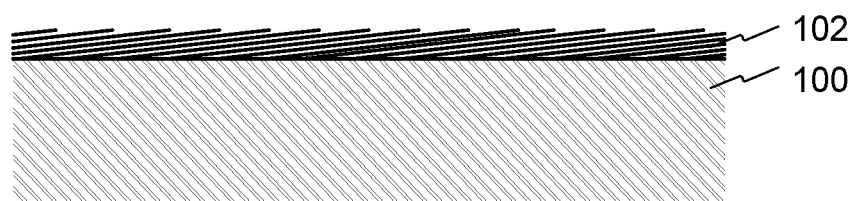
FIGS. 2A and 2B are each a cross-sectional view illustrating a surface condition of a positive electrode active material.
Figure 2B:
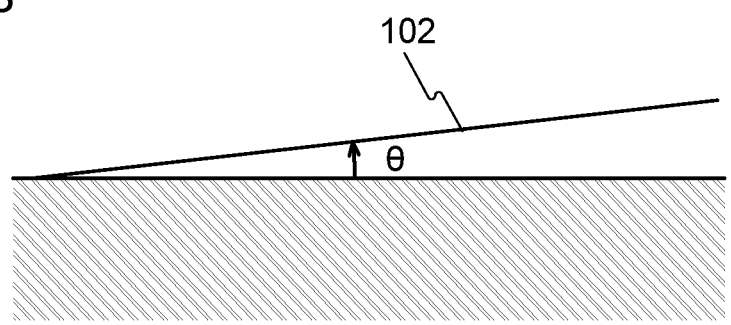

An example of a cross-sectional shape of the positive electrode active material obtained in this embodiment will be described with reference to FIGS. 2A and 2B. Note that FIG. 2A is a cross-sectional view of part of a surface of the positive electrode active material. FIG. 2B is an enlarged view of one sheet of graphene.

In FIG. 2A, the positive electrode active material includes a main material 100 included in the positive electrode active material and graphene 102.

The graphene 102 has an angle θ with respect to a surface of the main material 100 included in the positive electrode active material (see FIG. 2B). The angle θ is greater than or equal to 0° and less than 90°, preferably greater than or equal to 0° and less than 30°, further preferably greater than or equal to 0° and less than 10°, still further preferably greater than or equal to 0° and less than 3°. The conductivity of graphene is high in the two-dimensional direction; accordingly, the smaller the angle θ of the graphene 102 is and the larger the area of the graphene 102 is, the higher the surface conductivity of the positive electrode active material is. On the other hand, the conductivity of graphene is low in the direction where sheets thereof overlap with each other (the direction perpendicular to a surface of graphene).

In FIGS. 2A and 2B, the main material 100 included in the positive electrode active material is coated with the graphene 102 at an even angle; however, the angle θ of the graphene 102 may differ between sheets of graphene and does not need to be uniform. Further, there may be a region where the graphene 102 does not exist over the main material 100 included in the positive electrode active material.

A lithium ion cannot pass through graphene itself in the direction perpendicular to the surface of graphene but can move through a gap between sheets of graphene. Thus, graphene is provided to be slightly inclined, whereby exchange of lithium ions can be prevented from being inhibited.

According to this embodiment, a positive electrode active material which has sufficient conductivity can be manufactured even when a conduction auxiliary agent is not used or the amount of the conduction auxiliary agent is extremely small. Therefore, a positive electrode active material for an energy storage device having high capacity per weight or volume can be manufactured.

Note that this embodiment can be combined with any of the other embodiments as appropriate.

[Embodiment 2]

In this embodiment, an energy storage device using the positive electrode active material obtained by the manufacturing method described in Embodiment 1 will be described taking a lithium-ion secondary battery as an example. The schematic structure of the lithium-ion secondary battery will be described with reference to FIG. 3.

Figure 3:
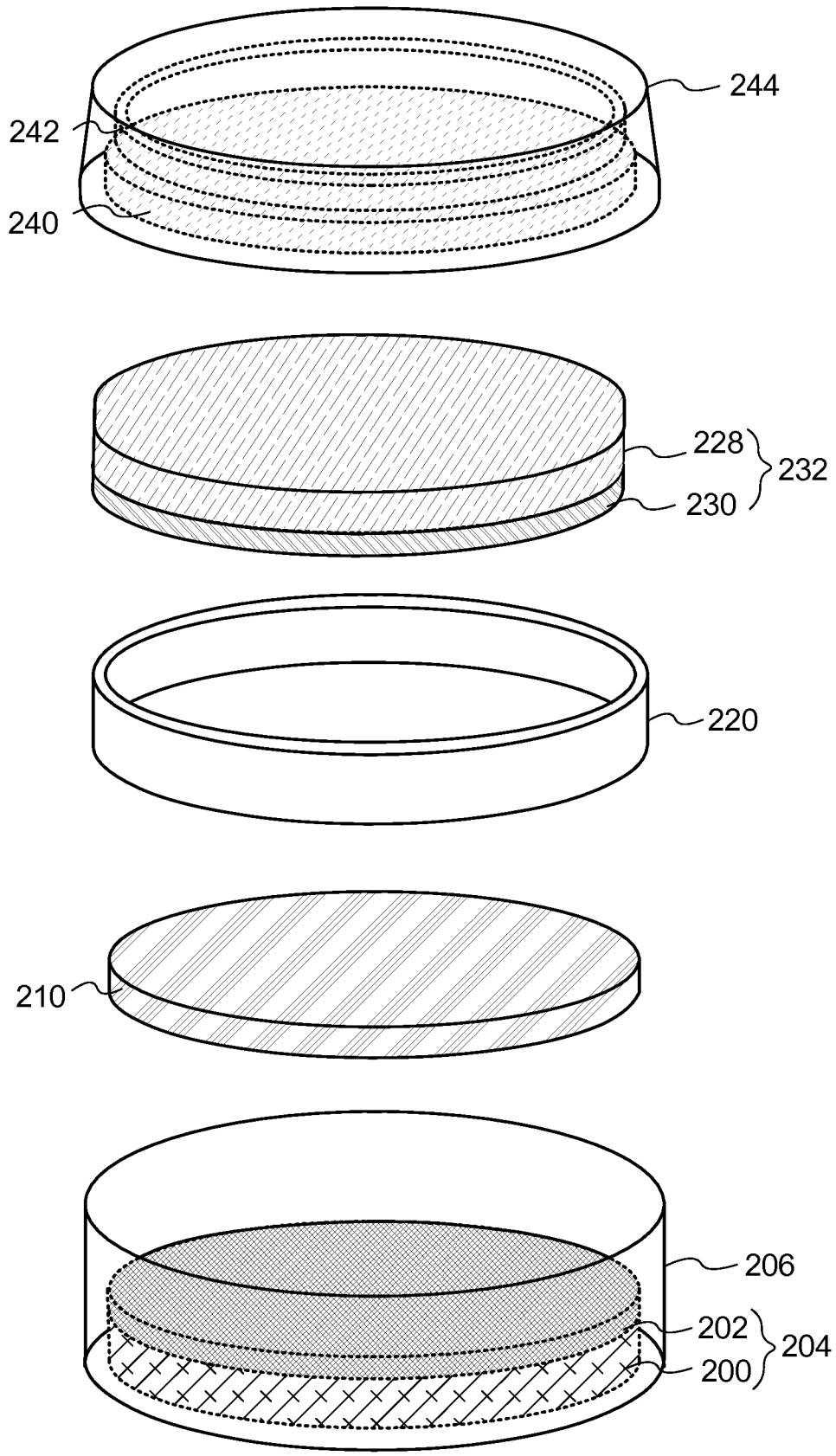
FIG. 3 illustrates a lithium-ion secondary battery.

Description is made below with reference to FIG. 3. FIG. 3 schematically illustrates the structure of a coin-type secondary battery. A slurry formed by mixing a binder into the positive electrode active material described in Embodiment 1 is applied onto a positive electrode current collector 228, molded, and then dried, whereby a positive electrode active material 230 is formed. As a material for the positive electrode current collector 228, aluminum is preferably used.

As the binder, a polysaccharide, a thermoplastic resin, a polymer with rubber elasticity, and the like can be given. Examples thereof include starch, polyvinyl alcohol, carboxymethyl cellulose, hydroxypropyl cellulose, regenerated cellulose, diacetyl cellulose, polyvinyl chloride, polyvinyl pyrrolidone, polytetrafluoroethylene, polyvinylidene fluoride, polyethylene, polypropylene, ethylene-propylene-diene monomer (EPDM), sulfonated EPDM, styrene-butadiene rubber, butadiene rubber, fluororubber, and polyethylene oxide. The binder accounts for greater than or equal to 1 wt % and less than or equal to 15 wt % of the whole positive electrode active material 230.

As illustrated in FIG. 3, the coin-type secondary battery includes a negative electrode 204, a positive electrode 232, a separator 210, an electrolyte solution (not illustrated), a housing 206, and a housing 244. Besides, the coin-type secondary battery includes a ring-shaped insulator 220, a spacer 240, and a washer 242. As the positive electrode 232, the electrode that is obtained in the above step by providing the positive electrode active material 230 for the positive electrode current collector 228 is used.

An electrolyte solution in which $LiPF_6$ is dissolved in a mixed solvent of ethylene carbonate (EC) and diethyl carbonate (DEC) is preferably used; however one embodiment of the present invention is not limited to this.

The negative electrode 204 includes a negative electrode active material 202 over a negative electrode current collector 200. As the negative electrode current collector 200, copper may be used, for example. As the negative electrode active material, graphite, polyacene, or the like is used. The negative electrode active material 202 is preferably formed using such a material alone or a mixture of the material and a binder. Alternatively, two-dimensional carbon obtained by the method described in Embodiment 1 may be used as a material for the negative electrode active material.

An insulator with pores (e.g., polypropylene) may be used for the separator 210. Alternatively, a solid electrolyte which can transmit lithium ions may be used.

The housing 206, the housing 244, the spacer 240, and the washer 242 each of which is made of metal (e.g., stainless steel) are preferably used. The housing 206 and the housing 244 have a function of electrically connecting the negative electrode 204 and the positive electrode 232 to the outside.

The negative electrode 204, the positive electrode 232, and the separator 210 are soaked in the electrolyte solution. Then, as illustrated in FIG. 3, the negative electrode 204, the separator 210, the ring-shaped insulator 220, the positive electrode 232, the spacer 240, the washer 242, and the housing 244 are stacked in this order with the housing 206 positioned at the bottom. The housing 206 and the housing 244 are subjected to pressure bonding. In such a manner, the coin-type lithium-ion secondary battery is manufactured.

In this embodiment, a positive electrode active material which has sufficient conductivity even when a conduction auxiliary agent is not used or the amount of the conduction auxiliary agent is extremely small is used. Therefore, an energy storage device having high capacity per weight or volume can be manufactured.

[Embodiment 3]

In this embodiment, an example of a lithium-ion secondary battery which is an energy storage device different from that in Embodiment 2 will be described. The schematic structure of the lithium-ion secondary battery is illustrated in FIG. 4.

Figure 4:
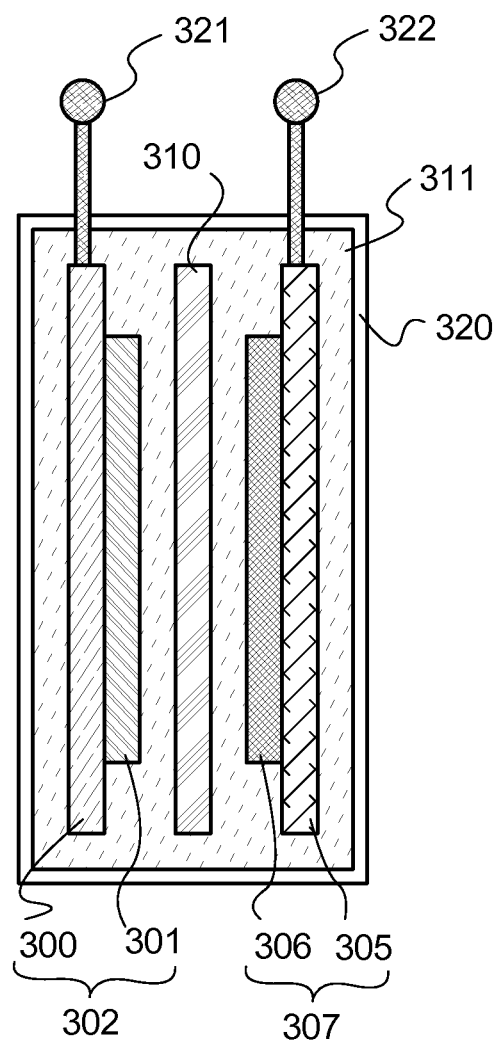
FIG. 4 illustrates a lithium-ion secondary battery.

In the lithium-ion secondary battery illustrated in FIG. 4, a positive electrode 302, a negative electrode 307, and a separator 310 are provided in a housing 320 which isolates the components from the outside, and the housing 320 is filled with an electrolyte solution 311. In addition, the separator 310 is provided between the positive electrode 302 and the negative electrode 307.

A positive electrode active material 301 is formed in contact with a positive electrode current collector 300. Here, the positive electrode active material 301 and the positive electrode current collector 300 provided with the positive electrode active material 301 are collectively referred to as the positive electrode 302.

On the other hand, a negative electrode active material 306 is formed in contact with a negative electrode current collector 305. Here, the negative electrode active material 306 and the negative electrode current collector 305 provided with the negative electrode active material 306 are collectively referred to as the negative electrode 307.

A first electrode 321 and a second electrode 322 are connected to the positive electrode current collector 300 and the negative electrode current collector 305, respectively, and charge and discharge are performed through the first electrode 321 and the second electrode 322.

Moreover, there are certain gaps between the positive electrode active material 301 and the separator 310 and between the negative electrode active material 306 and the separator 310. However, the structure is not limited to this; the positive electrode active material 301 may be in contact with the separator 310, and the negative electrode active material 306 may be in contact with the separator 310. Further, the lithium-ion secondary battery may be rolled into a cylinder with the separator 310 provided between the positive electrode 302 and the negative electrode 307.

The positive electrode current collector 300 may have a structure similar to that of the positive electrode current collector 228 described in Embodiment 2.

The positive electrode 302 is manufactured by forming the positive electrode active material 301 on the positive electrode current collector 300 as follows: a slurry formed by mixing a binder into the positive electrode active material described in Embodiment 1 is dropped onto the positive electrode current collector 300 and spread thinly by a casting method, and then pressed with a roller press machine so that the thickness becomes uniform; after that, vacuum drying (under a pressure of 10 Pa or lower) or heat drying (at a temperature of 70° C. to 280° C., preferably 90° C. to 170° C.) is performed. The positive electrode active material 301 may be formed to a thickness with which a crack or separation is not caused, specifically greater than or equal to 20 μm and less than or equal to 100 μm.

The negative electrode current collector 305 and the negative electrode active material 306 may have structures similar to those of the negative electrode current collector 200 and the negative electrode active material 202, respectively.

The electrolyte solution 311 may be similar to the electrolyte solution described in Embodiment 2.

The separator 310 may have a structure similar to that of the separator 210.

When charge of the lithium-ion secondary battery described above is performed, a positive electrode terminal is connected to the first electrode 321 and a negative electrode terminal is connected to the second electrode 322. An electron is taken away from the positive electrode 302 through the first electrode 321 and transferred to the negative electrode 307 through the second electrode 322. In addition, a lithium ion is eluted from the positive electrode active material in the positive electrode active material 301 of the positive electrode 302, reaches the negative electrode 307 through the separator 310, and is taken into the negative electrode active material in the negative electrode active material 306. The lithium ion and the electron are combined in this region and are occluded in the negative electrode active material 306. At the same time, in the positive electrode active material 301, an electron is released from the positive electrode active material, and oxidation reaction of transition metal (such as iron, manganese, cobalt, nickel, or vanadium) included in the positive electrode active material occurs.

At the time of discharge, in the negative electrode 307, the negative electrode active material 306 releases lithium as an ion, and an electron is transferred to the second electrode 322. The lithium ion passes through the separator 310, reaches the positive electrode active material 301, and is taken into the positive electrode active material in the positive electrode active material 301. At that time, an electron from the negative electrode 307 also reaches the positive electrode 302, and reduction reaction of the transition metal (such as iron, manganese, cobalt, nickel, or vanadium) included in the positive electrode active material occurs.

By applying the method for manufacturing the positive electrode active material described in Embodiment 1, a lithium-ion secondary battery having high capacity per volume and weight can be manufactured.

In the case where the positive electrode active material is coated with two-dimensional carbon, the thickness needed for improvement in conductivity can be reduced; accordingly, the particle diameter of the positive electrode active material can be made smaller than the conventional one, and a positive electrode into which lithium is easily injected and from which lithium is easily extracted can be manufactured.

In this embodiment, a positive electrode active material which has sufficient conductivity even when a conduction auxiliary agent is not used or the amount of the conduction auxiliary agent is extremely small is used. Therefore, an energy storage device having high capacity per weight or volume can be manufactured.

[Embodiment 4]

In this Embodiment, examples of application of the energy storage devices described in Embodiments 2 and 3 will be described.

The energy storage devices described in Embodiments 2 and 3 can be used in electronic devices such as cameras such as digital cameras or video cameras, digital photo frames, mobile phones (also referred to as cellular phones or cellular phone devices), portable game machines, portable information terminals, and audio reproducing devices. Further, the energy storage devices can be used in electric propulsion vehicles such as electric vehicles, hybrid vehicles, train vehicles, maintenance vehicles, carts, wheelchairs, and bicycles.

Figure 5A:
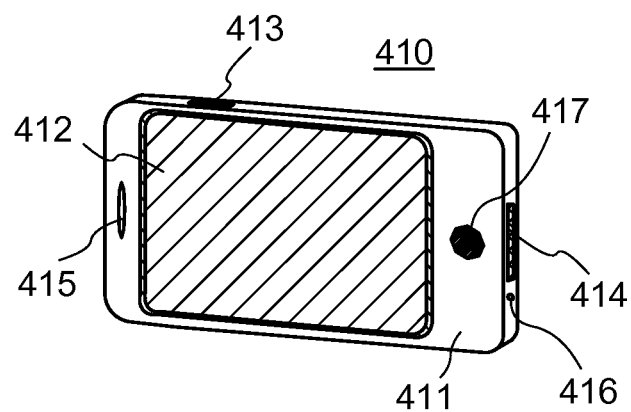
FIGS. 5A and 5B illustrate examples of application to electronic devices.

FIG. 5A illustrates an example of a mobile phone. In a mobile phone 410, a display portion 412 is incorporated in a housing 411. The housing 411 is provided with an operation button 413, an operation button 417, an external connection port 414, a speaker 415, a microphone 416, and the like.

Figure 5B:
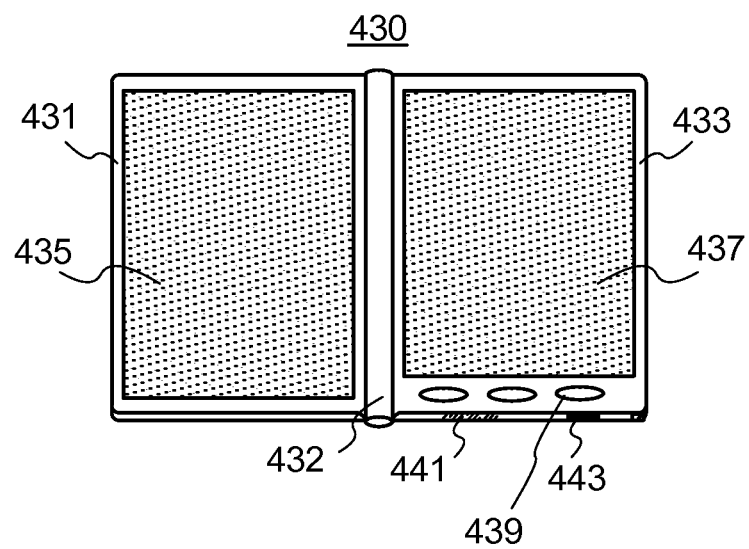

FIG. 5B illustrates an example of an e-book terminal. An e-book terminal 430 includes two housings, a first housing 431 and a second housing 433, which are combined with each other with a hinge 432. The first and second housings 431 and 433 can be opened and closed using the hinge 432 as an axis. A first display portion 435 and a second display portion 437 are incorporated in the first housing 431 and the second housing 433, respectively. In addition, the second housing 433 is provided with an operation button 439, a power switch 443, a speaker 441, and the like.

Figure 6:
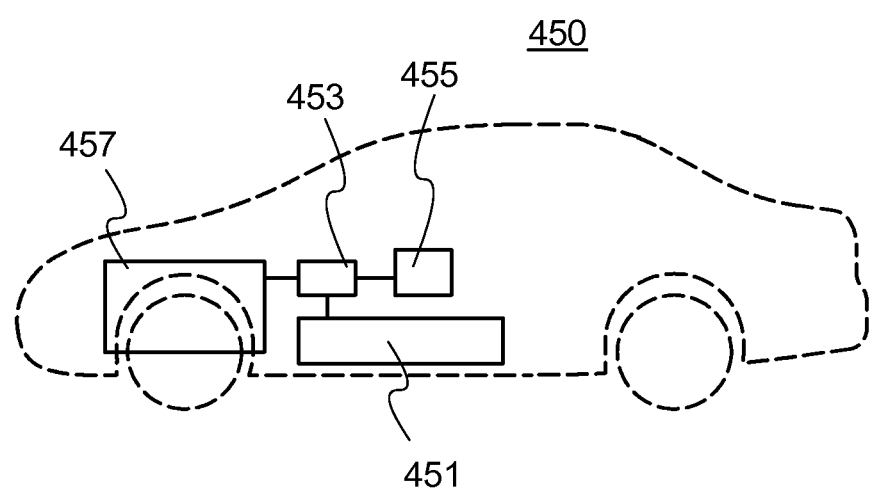
FIG. 6 illustrates an example of application to an electric vehicle.

FIG. 6 illustrates an example of an electric vehicle. An electric vehicle 450 is equipped with an energy storage device 451. The output of electric power of the energy storage device 451 is controlled by a control circuit 453 and the electric power is supplied to a driving device 457. The control circuit 453 is controlled by a computer 455.

The driving device 457 includes an electric motor (a DC motor or an AC motor), and, if necessary, an internal-combustion engine. In the case where the internal-combustion engine is incorporated, the internal-combustion engine and the electric motor are combined. The computer 455 outputs a control signal to the control circuit 453 on the basis of data of order (such as acceleration or stop) by a driver of the electric vehicle 450 or data of driving environment (such as an upgrade or a downgrade). The control circuit 453 adjusts the electric energy supplied from the energy storage device 451 in accordance with the control signal of the computer 455 to control the output of the driving device 457. In the case where the AC motor is mounted, an inverter which converts direct current into alternate current is incorporated.

The energy storage device 451 can be charged by external power supply.

Note that in the case where the electric propulsion vehicle is a train vehicle, the train vehicle can be charged by power supply from an overhead cable or a conductor rail.

EXPLANATION OF REFERENCES

100: main material included in positive electrode active material, 102: graphene, 200: negative electrode current collector, 202: negative electrode active material, 204: negative electrode, 206: housing, 210: separator, 228: positive electrode current collector, 230: positive electrode active material, 232: positive electrode, 240: spacer, 242: washer, 244: housing, 300: positive electrode current collector, 301: positive electrode active material, 302: positive electrode, 305: negative electrode current collector, 306: negative electrode active material, 307: negative electrode, 310: separator, 311: electrolyte solution, 320: housing, 321: first electrode, 322: second electrode, 410: mobile phone, 411: housing, 412: display portion, 413: operation button, 414: external connection port, 415: speaker, 416: microphone, 417: operation button, 430: e-book terminal, 431: housing, 432: hinge, 433: housing, 435: display portion, 437: display portion, 439: operation button, 441: speaker, 443: power switch, 450: electric vehicle, 451: energy storage device, 453: control circuit, 455: computer, and 457: driving device.

This application is based on Japanese Patent Application serial No. 2010-228602 filed with the Japan Patent Office on Oct. 8, 2010, the entire contents of which are hereby incorporated by reference.

The invention claimed is:

1. A method for manufacturing a positive electrode active material for an energy storage device, comprising the steps of:
    forming a mixture by mixing raw materials to be the positive electrode active material;
    performing a first baking on the mixture;
    grinding the mixture;
    adding a graphene oxide to the ground mixture;
    performing a second baking to form a reaction product, and to reduce the graphene oxide, whereby a surface of the reaction product is coated with graphene; and
    grinding the reaction product after the second baking to obtain the positive electrode active material,
    wherein the reaction product comprises lithium iron phosphate, lithium nickel phosphate, lithium cobalt phosphate, or lithium manganese phosphate, and
    wherein the graphene has an angle of greater than 0° and less than 3° with respect to a surface of the positive electrode active material.

2. The method for manufacturing a positive electrode active material for an energy storage device according to claim 1, wherein the mixture is ground before the first baking.

3. The method for manufacturing a positive electrode active material for an energy storage device according to claim 1, wherein a thickness of the graphene is greater than or equal to 0.34 nm and less than or equal to 3.4 nm.

4. The method for manufacturing a positive electrode active material for an energy storage device according to claim 1, wherein a particle diameter of the reaction product is less than or equal to 50 nm.

5. The method for manufacturing a positive electrode active material for an energy storage device according to claim 1, wherein the first baking is performed in an atmosphere of a rare gas, nitrogen, or hydrogen or under reduced pressure.

6. The method for manufacturing a positive electrode active material for an energy storage device according to claim 1, wherein the second baking is performed in an atmosphere of a rare gas, nitrogen, or hydrogen or under reduced pressure.

7. A method for manufacturing a positive electrode active material for an energy storage device, comprising the steps of:
    forming a mixture by mixing raw materials to be the positive electrode active material;
    performing a first baking on the mixture;
    grinding the mixture;
    adding a graphene oxide to the ground mixture;
    pressing and molding the mixture including the graphene oxide into a pellet;
    performing a second baking to form a reaction product, and to reduce the graphene oxide, whereby a surface of the reaction product is coated with graphene; and
    grinding the reaction product after the second baking to obtain the positive electrode active material,
    wherein the reaction product comprises lithium iron phosphate, lithium nickel phosphate, lithium cobalt phosphate, or lithium manganese phosphate, and
    wherein the graphene has an angle of greater than 0° and less than 3° with respect to a surface of the positive electrode active material.

8. The method for manufacturing a positive electrode active material for an energy storage device according to claim 7, wherein the mixture is ground before the first baking.

9. The method for manufacturing a positive electrode active material for an energy storage device according to claim 7, wherein a thickness of the graphene is greater than or equal to 0.34 nm and less than or equal to 3.4 nm.

10. The method for manufacturing a positive electrode active material for an energy storage device according to claim 7, wherein a particle diameter of the reaction product is less than or equal to 50 nm.

11. The method for manufacturing a positive electrode active material for an energy storage device according to claim 7, wherein the first baking is performed in an atmosphere of a rare gas, nitrogen, or hydrogen or under reduced pressure.

12. The method for manufacturing a positive electrode active material for an energy storage device according to claim 7, wherein the second baking is performed in an atmosphere of a rare gas, nitrogen, or hydrogen or under reduced pressure.

13. The method for manufacturing a positive electrode active material for an energy storage device according to claim 1, wherein the step of adding the graphene oxide to the ground mixture is performed in acetone with a ball mill.

14. The method for manufacturing a positive electrode active material for an energy storage device according to claim 7, wherein the step of adding the graphene oxide to the ground mixture is performed in acetone with a ball mill.

* * * * *